United States Patent Office 3,461,238
Patented Aug. 12, 1969

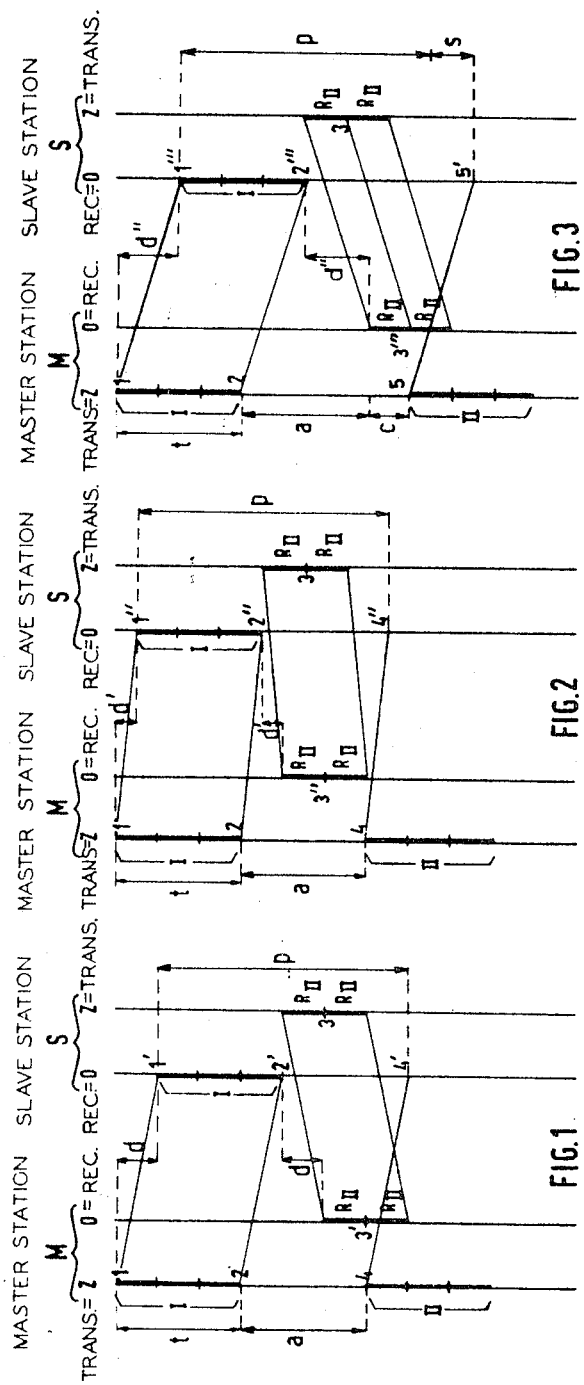

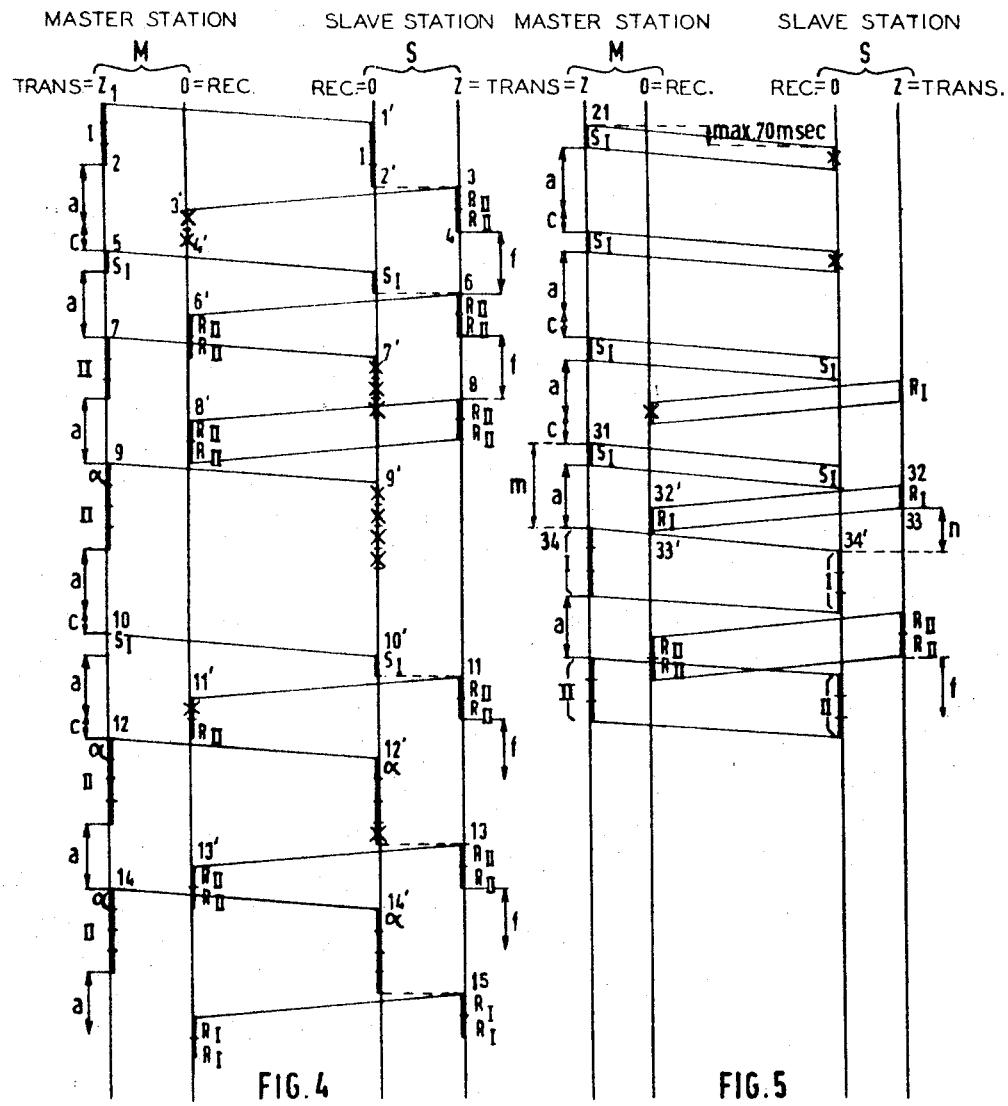

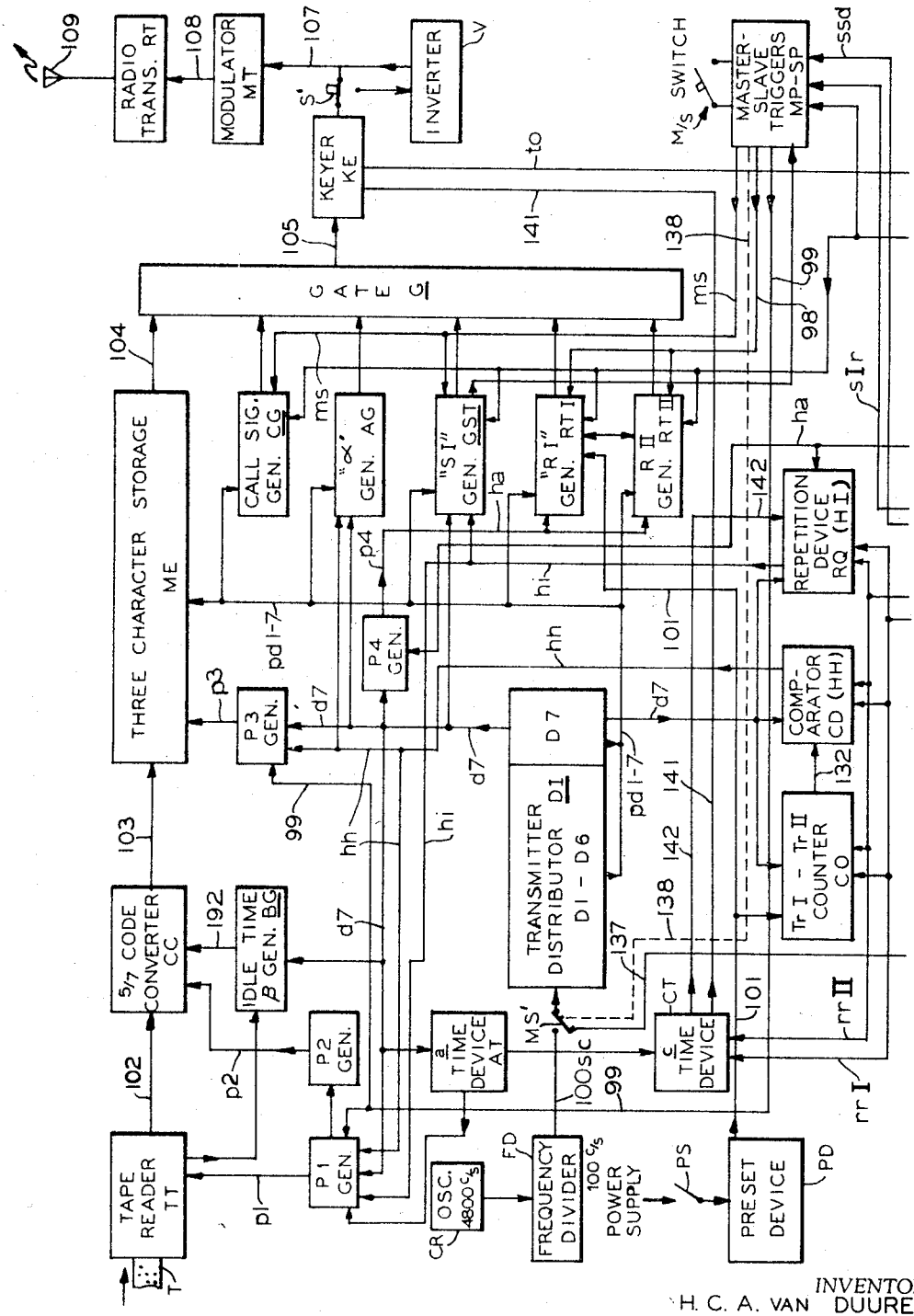

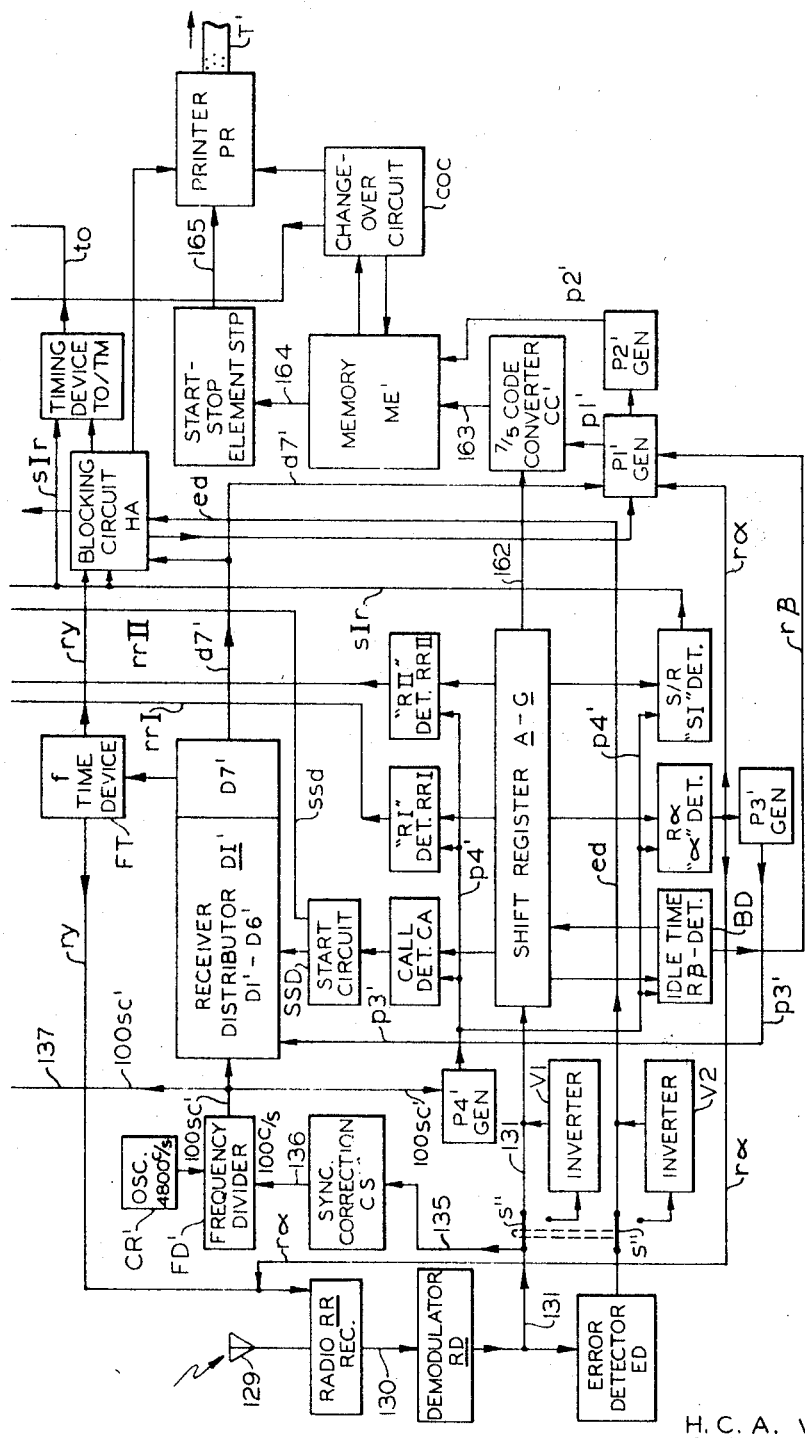

3,461,238
SIMPLEX TELECOMMUNICATION SYSTEM WITH AUTOMATIC ERROR DETECTION AND CORRECTION
Hendrik Cornelis Anthony van Duuren, Wassenaar, and Christiaan Johannes van Dalen and Herman da Silva, Voorburg, Netherlands, assignors to De Staat der Nederlanden, ten Deze Vertegenwoordigd Door de Directeur-Generaal der Posterijen, Telegrafie en Telefonie, The Hague, Netherlands
Continuation-in-part of application Ser. No. 94,337, Mar. 8, 1961. This application Nov. 28, 1966, Ser. No. 597,353
Claims priority, application Netherlands, June 15, 1960, 249,457; June 23, 1960, 253,005
Int. Cl. H04l 25/02
U.S. Cl. 178—69    25 Claims

ABSTRACT OF THE DISCLOSURE

A simplex (one-way traffic at a time) telecommunication system with automatic error detection and correction which comprises storing and transmitting alternately numbered I and II spaced blocks of signals, testing each signal in each block received, and sending back to the transmitting station signals corresponding to the numbers I and II in the spaces between the blocks, so that if a number II is received back after a number I block has been transmitted, the next block II is transmitted, but if a number I is received back after a number I block has been transmitted, then the number I block must be retransmitted.

RELATED APPLICATIONS

Van Duuren et al. U.S. patent application Ser. No. 94,337 filed Mar. 8, 1961, of which this application in a continuation-in-part, now abandoned.

Da Silva et al. U.S. copending patent application Ser. No. 218,894 filed Aug. 23, 1962, now U.S. Patent No. 3,273,063 issued Sept. 13, 1966 relating to an improvement for the present application involving changes in frequency after more than two errors occur in a given period of time, Van Duuren U.S. copending patent application Ser. No. 234,746 filed Sept. 1, 1962, now U.S. Patent No. 3,272,921 issued Sept. 13, 1966, for another improvement for the present application dealing with the scanning of the particular type of answer-back signal, and Da Silva U.S. copending patent application Ser. No. 235,972 filed Sept. 7, 1962, now abandoned and its continuation-in-part U.S. patent application Ser. No. 557,105 filed June 13, 1966, dealing with another improvement for the present application relating to an interrupt feature for changing the message direction between the two stations, namely what is generally shown in the change-over circuit shown in FIG. 12 of the present application.

BACKGROUND OF INVENTION

Similar automatic error correction telegraph systems are known from the Van Dalen and Van Duuren U.S. Patent No. 2,970,189 issued Jan. 31, 1961 and the copending patent application Ser. No. 600,001 filed June 25, 1956, now U.S. Patent No. 2,995,626 issued Aug. 8, 1961, in which the traffic is communicated between a master station and the slave station so that the master station always takes the initiative in transmitting the message and the slave station only gives signals serving inter alia as answers to the transmission from the master station. In these systems use is made of a duplex circuit, the "return" path of which is put in synchronism together with the "go" path under in influence of the establishment of synchronism on the "go" path. However, the use of two frequencies at the same time often caused interference, especially when the transmitter and receiver were relatively close together, such as for example on ships and planes approaching each other or approaching a home port.

However, the present invention relates to a simplex system in which the "go" path and "return" traffic between two stations are led alternately via a single pair of conductors or a single carrier frequency, by means of which message or traffic transmission can take place in one direction or the other, but not both directions simultaneously as in a duplex system, and in which synchronism between the stations is only established or maintained in the direction of the master station to the slave station. Therefore, in order that the master station can receive directions from the slave station, it is necessary that the transmitter is periodically at rest for an interval sufficiently long to allow the reception of a counter service or answer-back signal. However, previously to insert such a pause after each signal transmitted made such a system too slow.

SUMMARY OF THE INVENTION

This invention relates to a simplex (one-way traffic at a time) telecommunication system with error detection and correction. More particularly it deals with such a system in which a connection is established by a master station for the message or series of messages to be transmitted to a slave station, and by maintaining a certain synchronism between the stations for and the duration of these messages.

According to the simplex system of this invention, traffic is transmitted in blocks, of, for example, three signals on one carrier frequency, each block being followed by a pause to allow for the reception of an answer-back signal on the same carrier frequency, the nature of which answer-back signal depends upon the correct or correct reception of the block at the remote station. These blocks are locally associated, as they are transmitted and as they are received, with the same numbers, for example, alternately with the numbers I and II. Then there are two different answer-back signals which are correspondingly numbered, so that if the numbered answer-back signal is the same as the number associated with the block just transmitted, that block is to be repeated, and if it is the same as the other number, the next block is transmitted. Thus if a message receiving or slave station answers back for transmission of a block I and a block II has just been transmitted, then the message transmitting or master station knows that the block II has been properly received and the next block I must be transmitted. On the other hand, if the block II was requested to be repeated, the supply of signals at the master station must be stopped until the correct block II is transmitted.

In order to determine whether or not an error exists in any one of the multi-element signals transmitted, each multi-element signal is separately tested as it is received. Such a testing is facilitated by converting, if necessary, each message signal into a constant ratio code signal so that only this ratio need be tested. For example, if the thirty-two five-element binary telegraph signal Baudot code is to be communicated according to the system of this invention, it may be converted into a thirty-five seven-element binary code making available three more different signal combinations for use as special service signals, such as for two types of idle time signals and a specific service signal for requesting the repetition of an answer-back signal in the event one of the two answer-back signals is incorrectly received, or neither answer-back signal is received in the timed spaces allotted between the message blocks. On the other hand, there are thirty-five different possibilities for the two answering back signals, and if desired a third type answer-back signal may be used as an interrupting signal in the event the slave station wished to transmit to the master station, as is described in the above mentioned copending application Ser. No. 557,105 filed June 13, 1966.

The timing between the transmission of successive blocks of signals is determined from twice the duration of each block of signals plus twice the longest propagation time between the two stations, however, this time may be increased by the equal intervals of the duration of one signal in order to repeat an answer-back signal to increase its probability of being received, because such a repetition takes less time than that required for requesting its repetition if it is not received correctly.

Before the actual transmission of traffic can be made, the numbering of the groups of the signals of the two stations is initially set to be the same, such as for transmission and reception of block I, and all of the stations are normally in their slave station or message receiving positions. Thus, for starting a communication, the station wishing to transmit a message changes its position to that of a master station and a special service signal such as that for the request of the repetition of an answer-back signal may be used as or with a calling signal to start the desired slave station. Then the traffic blocks of signals are only transmitted after the reception at the master station of an answer-back signal for a block I which may be transmitted by the slave station either singly or in groups of two, three or more, in the event the first answer-back signal is incorrectly received. The master station then can pass only to its state II at the request of the slave station, when the slave station transmits an answer-back signal for block II after the correct reception of a block I. In the event that the slave station does not receive an answer within a certain predetermined period of time, it automatically stops transmitting answer-back signals.

If desired, the master station may cause each block of repeated signals to be preceded by a special idle time signal $\alpha$ which signal serves for orientation purposes at the slave station. However, this and all other idle time signals are not considered or treated as message signals by the slave station.

DESCRIPTION

Objects and advantages

Accordingly it is an object of the present invention to produce such a simplex one-way traffic system with interruptions which is not too slow and which combines automatic error detection and correction.

Another object is to produce such a simplex system that minimizes or eliminates the effect of radio path disturbances like fading, noise, and other interferences by using only one carrier frequency, so that a clean correct copy of the intended information is printed.

Another object is to produce such a system in which synchronism is maintained from the first element of each multi-element signal received.

Another object is to provide such a system in which the interrupt time is determined by the duration of the signal, the time it takes for the signal to be printed after it is transmitted, and the propagation time between the two stations, all of which times are based upon even multiples of the whole number of times which it takes to transmit one multi-element code signal.

Brief description of views

The above mentioned and other features and objects of this invention and the manner of attaining them will become more apparent and the invention itself will be understood best by reference to the following description of the embodiments of the invention taken in conjunction with the accompanying drawings, wherein:

FIG. 1 is a schematic time diagram for the transmission of signals between two stations wherein the propagation time is equal to a single signal duration time;

FIG. 2 is a schematic time diagram for the transmission of signals between two stations wherein the propagation time is less than a single duration time;

FIG. 3 is a schematic time diagram for the transmission of signals between two stations wherein the propagation time is greater than a single signal duration time;

FIG. 4 is a schematic time diagram of various signal disturbances which occur during the transmission of message signals from a master station to a slave station having a propagation time not in excess of the signal duration time.

FIG. 5 is a schematic time diagram of one embodiment for the initiation of signals between two stations including their mutilation;

FIG. 11 is a schematic block wiring diagram of the transmitter portion of a station circuit for carrying out the operation of the above time diagrams according to the present invention including several embodiments thereof; and FIG. 12 is a schematic block wiring diagram of the receiver portion of the station circuit used in cooperation with the circuit of FIG. 11.

The detailed description

Figure 10:
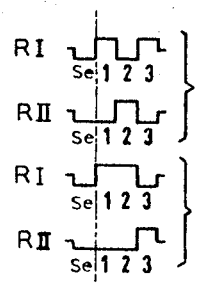
FIG. 10 is a wave diagram of two embodiments of the elements of answer back signals of fewer elements than are normally employed in the message signals for use in a system similar to that disclosed in FIG. 9.

In order to facilitate the understanding of the following detailed description, it is divided into sections according to the following outline:

I. TIME OPERATIONS (FIGS. 1 THROUGH 10)
    (A). Blocks of Signals (FIGS. 1 through 3)
    (B). Signal Mutilations (FIG. 4)
    (C). Starting Signals (FIG. 5)
    (D). Propagation Time Measuring (FIGS. 5 and 6)
    (E). Short Propagation Times (FIGS. 7 and 8)
    (F). Inverted Signals (FIGS. 9 and 10)

II. CIRCUIT OPERATIONS (FIGS. 11 and 12)
    (A). The Transmitter (FIG. 13)
        1. Correct operation
        2. Mutilated operations
    (B). The Receiver (FIG. 12)
        1. Correct operation
        2. Mutilated operations
    (C). Other Modifications

I. TIME OPERATIONS (FIGS. 1 THROUGH 10)

(A). Blocks of signals (FIGS. 1, 2 and 3)

The time diagrams in FIGS. 1, 2 and 3 illustrate the transmission of signals according to this invention without mutilation. The vertical lines in these diagrams represent the transmitters $z$ and receivers $o$ of the master and slave stations "M" and "S." Time proceeds regularly from the top to the bottom of each diagram. The slope of the transverse lines in these diagrams extending between the vertical lines $Mz$ and $So$, and $Mo$ and $Sz$, represent the propagation times $d$ in the two different directions between the two stations, which times are herein assumed to be equal in each direction. The heavy vertical lines represent the duration times $t$ of the signals. Blocks or groups I and II of three message or traffic signals are transmitted by the master station transmitter $Mz$ and received at the slave station receiver $So$, and these blocks usually last $3 \times 70$ milliseconds=210 milliseconds. The printing time $p$ of these blocks of signals requires $3 \times 140$ milliseconds=420 milliseconds, or twice as long the duration time $t$ of each block. So in the case of undisturbed traffic there must always be a delay $a$ between two blocks I and II of traffic signals of at least 420 milliseconds less 210 milliseconds.

In FIG. 1 the propagation time $d$ is supposed to be 70 milliseconds. The block I transmitted by the master station M between times 1 and 2 is received by the slave station S between the times 1' and 2'. Immediately after the correct reception of this block I, station S transmits at least one counter service or answer-back signal "RII," thus asking for the next block II. Preferably two successive answer-back signals are transmitted in order to insure better the correct reception of at least one of them. The first of these answer-back signals "RII" is recognized at moment 3', just after the expiration of the delay $a$, so that master station M then can immediately transmit the required block II at the moment 4. This block II reaches station S at moment 4', just after the expiration of the printing time $p$ for the three message signals of the preceding block I. If the duration of a block is assumed to be equal to $t$, the printing time $p=2t$, and the delay $a=t$ according to FIG. 1, because $a+t$ must be equal to $p$.

In FIG. 2 the propagation time $d'$ is supposed to be shorter than 70 milliseconds, namely 35 milliseconds per path. The block I transmitted between the time points 1 and 2 reaches station S between time points 1'' and 2''; and the two answer-back signals "RII" are transmitted immediately after the reception of this block. Station M recognizes this signal "RII" at the moment 3'', but the delay $a$ has not yet expired, so that station M must not transmit the required group II before the moment 4. Thus the first of group II traffic signals only arrives at station S at the moment 4'', just when the printing time $p$ for the preceding group I signals has expired.

In FIG. 3, the propagation time is supposed to be longer than 70 milliseconds per path, that is, 105 milliseconds. Herein the block I of traffic signals transmitted by master station M is received at the slave station S between time points 1''' and 2'''. In this case too, slave station S immediately transmits back the two answer-back signals "RII." However, when the required delay $a$ has expired at the master station M, this station M has not yet detected even the first answer-back signal "RII," so that no further traffic transmission can yet take place. The first answer-back signal "RII" only is recognized as such at the moment 3''', so that master station M cannot transmit the desired block II until the moment 5. This block II reaches the station S receiver $So$ at the moment 5', so that after the printing time $p$, the interval $s$ must be added as an extra stop for the printer at the slave station S. Thus at master station M, the delay $a$ must be prolonged by a time $c$, and in station S the printing time $p$ must be prolonged by a time $s$ equal to $c$. Accordingly, the speed of communication is reduced by 16.6% in the case of propagation times between 70 and 105 milliseconds.

In FIG. 3, the times $a+c=t+c$ which is the difference in time between the end of the transmission of block I at time point 2 and the end of the reception of the first answer-back signal "RII" at time point 3''' or 5. This time $a+c$ is equal to 2 times $d$ plus the duration of the answer-back signal "RI" or "RII" or $\frac{1}{3}t$. Hence $$a+c=t+c=2d+\tfrac{1}{3}t$$

$$c=2d-\tfrac{2}{3}t=2(d-\tfrac{1}{3}t)$$

$c$ being always chosen to be a whole multiple of $\frac{1}{3}t$, that is, the duration of one multi-element signal.

Accordingly, from a point of view of uniformity, the additional delay $c$ is always introduced at the master station M, if after the expiration of the delay $a$, no correct counter service or answer-back signal "RI" or "RII" has been detected during the time $a$, and similarly for slave station S as will be described later in section I–D and FIG. 6.

I–B. Signal Mutilations (FIG. 4)

FIG. 4 illustrates various cases of disturbances and the course of these disturbances in communications in which the propagation time does not exceed 70 milliseconds per path.

First in FIG. 4, the master station M transmits the block I between time points 1 and 2, and this block is received correctly by slave station S between time points or moments 1' and 2'. Immediately after this reception, the slave station S transmits two counter service or answer-back signals "RII" between the time points or moments 3 and 4, thus asking for a block II. However, both of these two counter service signals "RII" are mutilated on their way to the master station M, as indicated by crosses between the time points 3' and 4' on vertical line $Mo$. Accordingly at time point 4', the master station M has not yet received a correct answer-back signal during the whole time $a$ that began at the time point 2. In this case the delay $a$ is prolonged automatically by another time delay equal to the duration of one signal or one rotation $c$, in order to give the master station receiver $Mo$ the chance to receive at least the second answer-back signal "RII." After the moment 4', master station M waits no longer for an answer-back signal, and transmits at the moment 5 the third special service signal "SI" for requesting the repetition of the last counter service signal.

Slave station S after having finished its counter service signal "RII" transmission, also measures a delay $f$, which, like delay $a=$ time $t$ and herein is $3 \times 70$ or 210 milliseconds. This delay $f$, however, has the nature of a non-prolongable maximum delay, in which something must happen, whereas the delay $a$ is a prolongable minimum delay after which an event may be expected. The fact is that slave station S answers immediately after correct reception, and by the time delay $f$ has expired, the slave station S will then answer anyway, if no correct reception has been obtained. In FIG. 4 the end of the delay $f$ coincides with the end of the reception of the special request for repetition signal "SI." Then slave station S immediately transmits at the moment 6 the repetition of the two more successive answer-back signals "RII." If one of these answer-back signals "RII" is now correctly received at the station M, this station M transmits, after the delay $a$, the requested block II at the moment 7.

Meanwhile reception may have become so poor at the slave station S so that this block II, which should have appeared at the moment 7', is not received. Now after the expiration of the delay $f$, slave station S transmits again at moment 8, the same answer-back signals "RII" for a third time, which signals "RII" reach station M at the moment 8'. Then station M repeats the block II which may be preceded by a synchronization correcting special service or special idle time signal $\alpha$ at the moment 9. Such a special service signal $\alpha$ may precede every repetition made by the station M, if desired, for the purpose of indicating to the slave station S that the block of signals following it is a repetition. This signal $\alpha$ also aids in the signal synchronization of the slave station S after a delay caused by a mutilation. Since this special service signal $\alpha$ is considered a type of idle time signal, it is not printed by the printer at the receiving or slave station S.

After the transmission of the latest or third group of counter service signals "RII" at the moment 8 in FIG. 4, the slave station S needs no longer measure time because it may only transmit again after the correct reception of the block II or of a special request for repetition signal "SI." The fact is that after having received a faulty signal once, the slave station S re-transmits the answer-back signals "RII" after the maximum time $f$, but if after this no correct reception takes place, the transmission of the answer-back signals "RI" or "RII" is stopped, and consequently also so is the transmission of further blocks of message signals by station M.

If the station M still wishes to resume the transmission, it must act as in the opening or at the start of the communication. However, the opening must be effected in such a way that no interruption or duplications can occur in the current telegram or message. Consequently, further traffic from station M must be proceded by a signal serving to ascertain the position of the block signal counter at the slave station S. When station S transmits nothing, the station M will not receive anything after the delay $a+c$ and will accordingly transmit a signal "SI" at the moment 10 for the purpose of ascertaining the position of the counter at the slave station S. If the receiving conditions have become favorable again, and the slave station S receives this signal "SI" at the moment 10', and the slave station S starts again and gives an answer-back signal with the desired block number, herein signal "RII" at the moment 11. If desired, however, a plurality of the special service signals "SI" may be transmitted in an unnumbered block of signals in order to give the station S a better opportunity for detecting at least one of these special service signals "SI."

Now it has been assumed that the first counter service or answer-back signal "RII" is received mutilated, so that the delay $a$ must be prolonged. The second counter service signal "RII," however, is received correctly, after which station M transmits at the moment 12 the requested block II preceded by a signal $\alpha$. If this signal $\alpha$ and only the first two message signals in the block II are received correctly while the third message signal of this block II arrives mutilated, this block II is detected to be mutilated and it is requested once more by means of the answer-back signals "RII" at the moment 13.

If these signals "RII" arrive correctly at station M, the block II, preceded again by a signal $\alpha$ is repeated immediately after the delay $a$ at the moment 14, which coincides with the moment at which the first and correct answer-back signal "RII" is recognized. If now the whole group or block II is correctly received at the station S, the next answer-back signals "RI" are transmitted from the station S at the moment 15 requesting the next block I from station M.

I-C. Starting signals (FIG. 5)

The opening of a communication is effected as follows: the station that makes the initiation to open a communication switch itself into the position of a master station M. Next it transmits the special service signal "SI" at the moment 21 in FIG. 5 alone or in combination with a calling address signal (not shown), and when the signal "SI" is received by the called slave station S, which already is in its slave station position as are all stations when not in use, this called station S returns the first state I answer-back signal "RI" to put the master station M in the preliminary position by transmitting the first message block I. This first answer-back signal "RI" is transmitted in order to give the master station an opportunity to insure the correct propagation time unambiguously. The master station M then may repeat the call and signal "SI" at moment 31, whether the former first call signal was received mutilated or not, to be requested slave station S, and in response thereto the answer-back signal "RI" is repeated again between the moments 32 and 33. The master station M then may send at moment 34 a block I of message or idle time signals $\beta$ (not shown), so that the slave station S then knows that the master station M is ready. The slave station S after that may answer back with the second answer-back signal "RII" requesting that the message start.

According to FIG. 5, however, the special service signal "SI" is repeated at intervals $a+c$ in time and if this "SI" signal is not received, of course no answer-back signal "RI" is sent or received at the master station M. This transmission of the signal "SI" or together with the call signal, is continued until the counter service signal "RI" is detected during a transmitting pause. In the case of FIG. 5, master station M has to transmit the signals "SI" three spaced and separate times, because the slave station S does not receive the first two. It has been assumed that the third signal "SI" is received correctly at the slave station S so that this station immediately responds by the transmission of the counter service signal "RI," thus asking for the block I. If desired, a complete unnumbered block or group of three successive third signals "SI" may be transmitted to speed up the starting connection, in that the slave station starts as soon as it detects the first unmutilated service signal "SI."

I-D. Propagation time measuring (FIGS. 5 and 6)

In FIG. 5, the time taken between the moment 31 (the beginning of the transmission of the last signal "SI") and the moment 33' (the end of the reception of the counter service signal "RI") equals twice the duration of the signal "SI" plus the propagation times of the "go" and "return" paths. So if this time is called $m$, then $m = 2 \times \frac{1}{3}t - 2d$, where $t$=time for three signals or one group or block of signals, and $d$ is the propagation time between stations M and S (see also FIG. 1). Hence the propagation time $d = \frac{1}{2}m - \frac{1}{3}t$. Accordingly, station M now knows the propagation time and can give the requested block I at moment 34, which is right after having let the delay $a$ expire after its transmission of the signal "SI." This block I arrives at station S at the moment 34', so now slave station S can determine the propagation time, notably by measuring the time $n$, which is the time elapsing between the end of the transmission of the counter service signal "RI" at moment 33 and the beginning of the reception of the block I at moment 34'. Thus the propagation time $d = \frac{1}{2}n$. These measurements may be of interest if excessively long propagation times occur, so that the delay $a+c$ at station M, and delay $f$ at station S would have to be prolonged.

Figure 6:
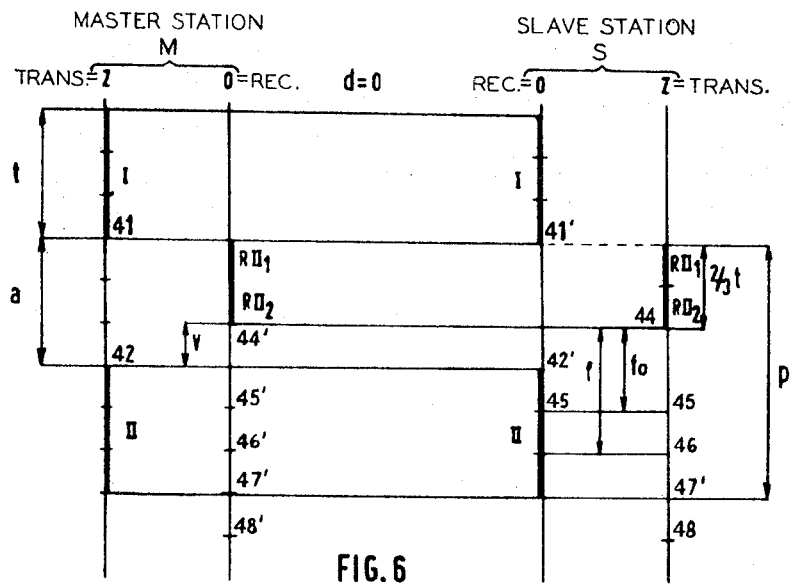
FIG. 6 is a schematic time diagram of the transmission of signals between two stations wherein the propagation time is zero in order to illustrate mathematically the relationships between the times of interruption between blocks of signals and the prolongations of these times for better possible reception of answer-back signals.

Now the relations between the various times will be derived with the aid of FIG. 6 drawn for a zero propagation time, namely $d=0$, and drawn for the transmission of a block I by station M to take $t$ milliseconds and the printing of these signals (assuming the whole block arrived correctly) to last $p$ milliseconds beginning at the moment 41' and ending at moment 47'. Thus the next block II of three letters or signals must not be received before the moment 42 or 42' in order to permit sufficient time $p$ for the printing of the block I signals. Accordingly the nominal delay lies between the time points 41 and 42. This means that the delay $a+$transmission time $t=$the printing time $p$, or $a=p-t$, $a$ being again the minimum delay. If the transmission time per signal is $\frac{1}{2}$ times the printing time $p$ per signal, $p=2t$ and $a=t$.

The fact is that the answer-back signals "RII" transmitted by the station S between the moments 41' and 44 can be received at station M by moment 44'. So there remains a time $v$ before the minimum delay $a$ has expired, after which, if either of the two answer-back signals have been received at station M, there is no need for further waiting. This is the case as long as $v$ is greater than 0 milliseconds. The additional delay $c$ can be chosen in a number of values, differing by steps according to the range in which the propagation time lies.

The time in which the counter service service signals "RII" are transmitted is $\frac{2}{3}t$. If $\frac{2}{3}t+v=a$, $v$ being positive, $c$ will be 0 milliseconds. So if the single propagation time $d=\frac{1}{2}v$, the additional delay can be $c=0$ milliseconds. In other terms for an extra delay of $c=0$ milliseconds, the propagation time per path must be $d$ maximum=$\frac{1}{2}v$ or equals $\frac{1}{2}p-\frac{5}{6}t$. This is derived from the formula that $v=a-\frac{2}{3}t$ and $a=p-t$. Combining these two formulas we obtain:

$$v = p - t - \frac{2}{3}t$$

and converting:

$$v/2 = p/2 - t/2 - 2t/6 = p/2 - 3t/6 - 2t/6 = p/2 - 5t/6$$

With a transmitting speed of 100 bauds (100 bits per second) and a printing speed of 50 bauds, this means that the maximum propagation time may be 35 milliseconds. If the delay is increased by $c=\frac{1}{3}t$, the propagation time may be $d=\frac{1}{2}(v+\frac{1}{3}t)$, so $d$ maximum=$\frac{1}{3}t$, which, with the transmitting and printing speeds mentioned, amounts to 70 milliseconds.

Since the propagation in line apparatus normally takes a time of about 20 milliseconds, the actual propagation time per path must not exceed 15 milliseconds with $c=0$.

Therefore an additional delay of $c=\frac{1}{3}t$ is always added to the time $a$ for communications in which the overall propagation time does not exceed 70 milliseconds per path. If the additional delay $c$ is made, that is $c=\frac{2}{3}t$ and $v=t/3$, $d$ maximum will be equal to $\frac{1}{2}(v+\frac{2}{3}t)=\frac{1}{2}t$ milliseconds, which, in the case mentioned, amounts to 105 milliseconds. Larger propagation times are not probable.

The ascertainment of the propagation time $d$ by the master station M at the opening of the communication is intended to determine whether the additional delay $c$ must be $\frac{1}{3}t$ or $\frac{2}{3}t$.

The delay $f$ at slave station S is derived from the following considerations: In the case of a propagation time $d=0$ milliseconds (FIG. 6), the first signal of group II must have arrived at station S at the moment 45. If this is not the case, station S will never receive this block correctly. So if no signal has been received by the time moment 45 arrives the station S could already give the answer-back signal asking for a repetition. In that case the delay would be $fo=t-\frac{1}{3}t=\frac{2}{3}t$. If, however, the station S transmits the two answer-back signals "RII1," "RII2" at moment 45, they will then arrive at the station M between moments 45' and 47', the very time when the second and third signals of block II are being transmitted. This means that station M would receive neither of these answer-back signals "RII1" and "RII2," because during transmission in a simplex system all reception is blocked. If $fo$ is increased by an additional time of $\frac{1}{3}t$ to $f$, the counter service signals "RII1" and "RII2" will be transmitted after $f$ at moment 46, and only the second counter service signal "RII2" will reach the station M between the moments 47' and 48' so that then detection of this second counter service signal "RII2" may be possible, if it is correctly received.

I–E. Short propagation times (FIGS. 7 and 8)

Figure 7:
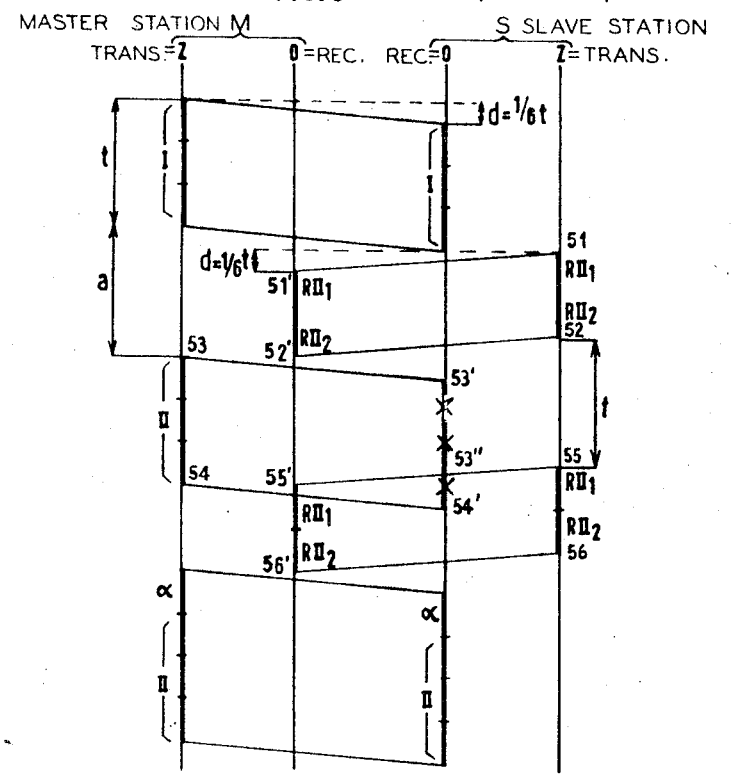
FIG. 7 is a schematic time diagram of the transmission of signals between two stations wherein the propagation time is one sixth of the signal duration time.
Figures 8, 9:
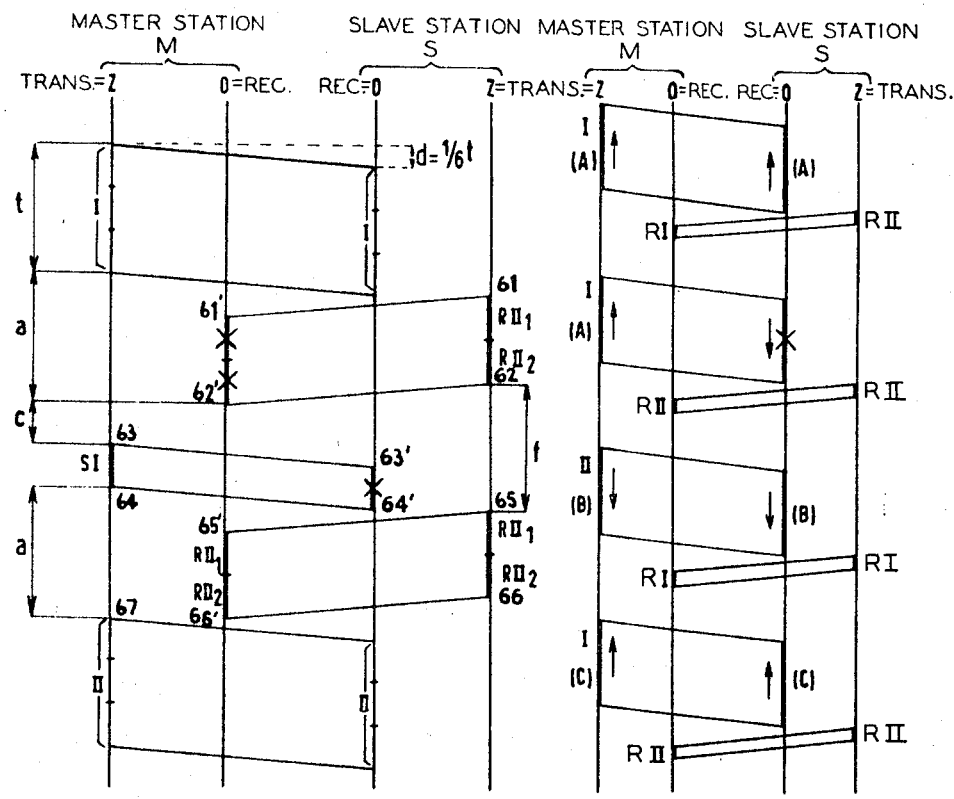
FIG. 8 is a schematic time diagram similar to FIG. 7 showing mutilation of the answer back signals.
FIG. 9 is a schematic time diagram similar to FIG. 4 in which alternate signals are inverted, or have reversed mark/space ratios, in accordance with a further embodiment of the present invention.

In FIG. 7 it has been assumed that the propagation time per path is $d=\frac{1}{6}t$ milliseconds, and after the correct reception of block I, station S transmits twice the answer-back signal "RII" between the moments 51 and 52. Thus the second counter service signal "RII2" is received at the station M at the moment 52' just when the minimum delay $a=t$ has expired. Every answer back signal has a duration of $\frac{1}{3}t$, so the end of the signal "RII2" is received at the station M in $2\times\frac{1}{6}t$ (propagation time in "go" and "return" path)$+2\times\frac{1}{3}t$ (the duration of the two counter service signals)$=t$ or$=a$ milliseconds after the end of the transmission of block I. Station M transmits block II then at moment 53, immediately after the delay $a$; so that this block II must arrive at station S between moments 53' and 54'. If at moment 53'' station S has not yet received any signal correctly, block II will never be received correctly and station S need not to wait until moment 54' to request a repetition, but it can repeat the answer-back signals "RII" at the moment 55 after the expiration of the delay $f$.

These answer-back signals will be received at station M between the moments 55' and 56', immediately after the transmission of block II has finished, so as to be in a listening period at the station M between the transmission of two successive signal blocks.

In FIG. 8 too, the propagation time $d$ is supposed to be $\frac{1}{6}t$. Thus after the reception of block I, station S transmits the answer-back signals "RII1" and "RII2" between the moments 61 and 62 and these signals RII should be received at station M between moments 61' and 62'. However, if station M has not received a correct signal "RII" by the moment 62', the delay at the station M will be prolonged by a time $c=\frac{1}{3}t$. If this prolonged time also expires without station M detecting a correct answer-back signal "RII," this station M will transmit the RQ or request for repetition of the answer-back signal "SI" at the moment 63. This RQ signal "SI" is due at slave station S between the moments 63' and 64'. If it fails to appear, this station S transmits the counter service signals "RII" again at the moment 64' or 65, just when the delay $f$ has expired. Now these repeated answer-back signals "RII" are received at the station M between moments 65' and 66', just before the moment when the minimum dalay $a$ expires and still arrive in the listening period of station M, so that this station M can proceed with the transmission of the requested block II at the moment 67.

It results from these two examples that, if during the delay $f=t$, the station S receives no correct signals, this station S can repeat the counter service signals "RI" or "RII" immediately after the expiration of the delay $f$ with the restriction, however, that the overall propagation time must not exceed $\frac{2}{3}t$ or $\frac{1}{3}t$. So if at the opening of the communication, station S has ascertained a long propagation time, the delay $f$ as well as the additional delay $c$ at station M will have to be increased by $\frac{1}{3}t$. However, with a propagation time $d=0$, the delay at station S will be $f=\frac{2}{3}t+\frac{1}{3}t=t$.

I–F. Inverted signals (FIGS. 9 and 10)

FIG. 9 illustrates a variant of the traffic handling, particularly suited for telegraph traffic of data wherein less time is used and fewer errors are tolerated. To increase the security of the communication, the master station M not only locally numbers alternate blocks of signals, but also makes the numbered block indications accompany each block of signals by transmitting them alternately with normal and inverted polarities, that is, in the seven unit constant ratio code, alternately transmitting the signals in separate blocks with three marks and four spaces and then with four marks and three spaces.

In the FIG. 9, the block I is marked (A) and is shown to be transmitted with normal polarity (see upward arrow). On receipt of the block I(A), station S asks for the next block II by transmitting a single answer-back signal "RII." Now suppose, for the purposes of an illustrative example, that even this heavily protected signal "RII" is interpreted in station M as being a signal "RI." This station M then repeats the previous block I(A) of signals in the normal polarity. This block I(A), however, is not accepted in the station S the second time because station S now expects an inverted group or a block with signals of inverted polarity (see downward arrow). Accordingly, this second block I(A) is denoted as being faulty on reception. Then station S sends another signal "RII" asking for group or block II of signals once more. Now it is very unlikely that this second signal "RII" is transposed into a signal "RI" again, so that on receipt of the signal "RII," station M continues its transmission with block II(B) in the inverted polarity. This group II(B) is supposed to be received correctly in the station S and will be accepted since this station still expects an inverted block II.

In such cases of checking blocks also by inverting their polarity, a transmission of only one answer-back signal "RI" or "RII" may be used, and it even may be of shorter duration or of fewer elements than a message signal. Examples of how such shorter inverted answer-back signals may be built up are shown in FIG. 10. All but the start element *se* of each of these signals "RI" and "RII" are the inverse of each other, the start signal *se* always being negative for synchronization purposes. Further, in FIG. 10 these shorter answer-back signals consist only of four elements instead of five or seven elements, thereby further decreasing the time for communication by not requiring so much answer-back time or space between blocks of message signals.

II. CIRCUIT OPERATIONS (FIGS. 11 AND 12)

FIGS. 11 and 12 combined show a schematic block wiring diagram of a transmitter and receiver, respectively, for any one station according to this invention. Whether that station is a master station M or a slave station S is controlled by the manual master-slave switch M/S shown in the lower right hand corner of the transmitter circuit shown in FIG. 11.

Although several blocks or boxes of circuits are shown in each figure, all of them are not in use all of the time, because of the different operation of a master from a slave station, and because these diagrams also include blocks of optional circuits of different modifications and embodiments which can readily be adapted to the system of this invention without departing from the scope thereof. Furthermore, it is to be understood that these blocks contain more than just one or more trigger circuits in that they also include the logic circuits, such as AND- and OR-gates for the control of these trigger circuits. The omission of these details, which are standard elements, is done in order to simplify the following description of this system as much as possible. Also the conductors connecting the block circuits in the diagrams of FIGS. 11 and 12 often will be marked with the reference characters corresponding in the pulses which are conducted through them in order to reduce the number of reference characters and improve the clarity and simplicity of this description.

II(a). The transmitter (FIG. 11)

The energization of any station is caused by closing the power supply switch PS in the lower left corner of FIG. 11 which pre-sets the counter CO via conductor 101 and the first answer-back signal generator RTI for the first answer-back signal "RI." This insures that each station always starts its local counting with the first number I to be associated with the first block of signals to be communicated.

That part of the illustrated transmitter circuit in FIG. 11 which is in use when the station acts as a master station M according to one embodiment of this invention, includes: a tape transmitter TT, a code converter 7/5 CC, a three signal character storage or memory circuit ME, a keyer KE with its input logic circuits in gate G, a counter CO, a comparing device CD, a transmitting distributor DI, a number of pulse generators P1, P2 and P3 operated from the last trigger D7 of the distributor DI, an *a*-time and a *c*-time measuring and determining devices AT and CT, a special service signal "SI" generator CSI, possibly also a call signal generator CG, an α signal generator AG, and a repetition device RQ.

That part of this transmitter circuit in use when the station acts as a slave station S includes: an answer-back signal "RI" generator RTI, an answer-back signal "RII" generator RTII, a pulse generator P4, and the distributor DI which through logic circuits in the answer-back signal generators RTI and RTII controls the transmission of the answer-back signals "RI" and "RII."

The seven triggers D1 through D7 in the transmitter distributor DI are controlled via the conductor 100*cs* from a frequency divider FD which divides a 4800 cycle per second frequency from crystal oscillator CR down into 100 cycles per second.

Since all of the stations normally stand with their M/S switches open ready to be receiving or slave stations, when a station starts to transmit a message, the master switch M/S is closed to indicate that that particular station is now to perform as a master station M. Thus, when the master-slave switch M/S is operated, the MP trigger or relay therein goes into its "mark" position while the SP trigger or relay therein at the remote or slave station remains in its "mark" position.

As a particular one of a plurality of slave stations may be called, the operation of this switch M/S operates the switch MS' via connection 138 to connect the frequency divider FO to the distributor DI and to start the operation of the special service signal "SI" generator GSI in a conductor *ms*, as well as to operate the call signal generator CG. Thus only the slave station is operated which responds to the particular called signal in its call detector CA in FIG. 12 to operate its start circuit SSD to start up its local receiver distributor DI'. This start circuit SSD controls that slave station's slave trigger SP via conductor *ssd* to maintain blocked the operation of that slave station's signal "RI" and "RII" generator RTI and RTII via conductor 98. On the other hand, the pulse generators P1, P2 and P3 are unblocked by the trigger MP via conductor 99 at the master station for the transmission of traffic signals.

In the specific embodiment described, message signals in a five-unit code, such as on a telegraph tape T, may be fed into the system of this invention at the upper left hand corner of FIG. 11 to the tape reader TT where the code on this tape T is transferred to five triggers (not shown), under the control of the pulses *p*1 from the pulse generator P1. This five unit code message is then conducted via the conductor 102 to the 5/7 code converter CC where it is converted under the control of the pulses *p*2 from pulse generator P2 into a seven unit code comprising a ¾ constant ration of "mark" and "space" or "space" and "mark" signal elements. From this code converter CC, the resulting seven unit signal is transferred via conductor 103 to the three character storage or memory circuit ME which stores the last block of three signals transmitted, in the event that when an error occurs they may be easily and quickly re-transmitted without taking the time for stepping back the tape T. From the character storage ME, the seven elements of each signal are sequentially conducted, under the control of pulses *pd*1–7 from the triggers D1 through D7 of distributor DI, via conductor 104 through the logic circuits of gate G and conductor 105 to the keyer KE. Thence these message signals are passed directly to a transmitter modulator MT via conductor 107 (since in this embodiment switch S' is in the full line position shown) where these signals are modulated onto a single frequency carrier wave. From this modulator MT this single carrier may be passed via a cable to the remote station or via conductor 108 to the radio transmitter RT and transmitted by radio from antenna 109.

In the event that no traffic or message signals are being transmitted from the master station M there is provided an idle time β signal generator BG which may be controlled by the tape reader TT via conductor 191 to generate the idle time β signals in the code converter CC via conductor 192 under the control of the *d*7 pulses from the transmitter distributor DI. These idle time β signals are then transmitted in blocks of three to the three character storage ME and out through the keyer KE to the radio transmitter RT. These signals are associated with the numbers I and II for their blocks both at the transmitting and the receiving stations.

II(A)–1. Correct operation

Since, according to the embodiments described of this invention, the signals are sent in groups or blocks of three, these blocks are counted under the control of the last pulse *d*7 from the trigger D7 of the transmitter distributor DI connected to the counter CO, the pulse generators P1, P2, P3 and P4 and the time device AT.

Suppose now that three signals in a block I are transmitted from a station M, and the counter CO is in its I position and so is the counter CO in the remote or slave station. Suppose also that these three signals in the block I are received correctly in the slave station S. Then the slave station S will transmit a signal "RII" as a request for the next block II of signals, which signal "RII" is transmitted via the generator RTII under control of the distributor DI pulses $pd1$–$7$ and pulse generator P4 pulse $p4$ to the two generators RTI and RTII, in that the pulse generator P4 is not blocked by the blocking circuit HA (see FIG. 12) via pulse $ha$ from the local receiver, because of the proper reception of the correctly numbered block I at this slave station. When this signal "RII" is received by the master station M, it is detected in its corresponding receiver in the detector "RII" detector RRII to control via its pulse $rrII$ the counter CO and comparator CD. Since the comparison is proper, the trigger HH in the comparator circuit CD is not operated and thereby no blocking pulse $hh$ is generated to block the operation of the pulse generators P1, P2 and P3 to prevent the pulses $p1$, $p2$, and $p3$ from operating the tape reader TT and transmitting the next block II of three signals.

II(A)–2. Mutilated operations

Suppose now that the three signals belonging to group I are received mutilated in the slave station S, that is, one of the signals as it is received over the antenna 129 in FIG. 12 is conducted through the radio receiver RR and thence via conductor 130 to the receiver demodulator RD and thence via conductor 131 and switch S″ (in this embodiment in the position shown) to shift register A–G and to the error detector ED. This error detector ED having detected the error causes an impulse $ed$ to be passed to the blocking circuit HA which in turn via pulse $ha$ from blocking circuit HA causes the answer-back signal generators RTI and RTII to remain in the same position so that the slave station will transmit again the same answer-back signal "RI" thereby requesting the master station to re-transmit the block I of signals which are still stored in the memory ME.

Suppose further that this second answer-back signal "RI" is received correctly in the master station M, and detected in detector RRI to produce the pulse $rrI$ which is passed to the counter circuit CO and comparator circuit CD and repetition device RQ. Under these conditions, the output 132 of the counter circuit CO that is compared in the comparator circuit CD operates the trigger HH to produce an impulse $hh$ which blocks the pulse generators P1 and P2 so they cannot cause the transmission of a new block of signals and simultaneously operates the pulse generator P3 to generate the pulses $p3$ connected to the storage device ME to re-transmit the three signals stored therein and repeat the last group I via the keyer KE and transmitter RT.

Between the transmission of the two groups of signals I and II in the master station M, the propagation time is measured in the time measuring devices AT and CT and the keyer KE is blocked via conductor 141 from the device CT. This measuring may be done by three triggers (not shown) in the circuit device AT for counting the three signals or revolutions of distributor DI according to the pulses $d7$. At the end of the third revolution the time device AT passes a pulse to the second time device circuit CT which, however, is blocked by either an $rrI$ or $rrII$ pulse produced by the reception of either an "RI" or an "RII" answer-back signal in the corresponding detectors RRI and RRII during this three revolution time $a$. However, if during this three revolution time $a$ a signal "RI" or "RII" has not been correctly received or received at all, then the time device CT is operated to await one more revolution of the distributor or time $c$ for the reception of an answer-back signal "RI" or "RII." If during this additional time period $c$, granted by the circuit device CT, an answer-back signal is still not received, the keyer KE is then de-blocked via conductor 141 so that further signals can be transmitted. On the other hand, if an answer-back signal is properly received within the times $a+c$, the keyer KE is immediately de-blocked via the conductor 141, and the message signal transmission continues by either repeating a signal block (if the unexpected answer-back signal is received) or transmitting the next signal block (if the expected answer-back signal is received).

In the event that these answer-back signals are not received in the time $a+c$, an impulse in conductor 142 is conducted to the repetition device RQ, which operates its trigger HI to generate a pulse $hi$ to operate the "SI" signal generator GSI and simultaneously to block the pulse generators P1 and P2. Thus the special service signal "SI" is generated and transmitted for requesting a repetition of the last transmitted answer-back signal from the slave station and the tape reader TT is blocked from feeding in new signals. This "SI" generator GSI is also controlled by the transmitter distributor DI pulses $pd1$–$7$, and pulse $d7$ via pulse generator P4 and pulse $p4$.

If the master station M does receive an answer-back signal "RI" or "RII" during the time $a$ or $a+c$, then at the end of the third or fourth revolution of the transmitter distributor DI, the requested block of signals is transmitted. However, if this block of signals is a repeated block of signals, it may be preceded by a special idle time signal $\alpha$ from the $\alpha$ generator AG. This generator AG is controlled by the pulses $pd1$–$7$ from transmitter distributor DI, the pulse $d7$ from the last trigger D7 of the distributor DI, and the pulse $hh$ from the comparator circuit CD trigger HH which is energized when a repetition is to be made. This signal may or may not be transmitted, as desired, but if it is, it can be used at the slave station when it is received to indicate that the block immediately following it is a repeated block of signals, and also, in the event there has been a relatively long time since the last block of signals were properly received, the first element of this signal $\alpha$ can be used to presynchronize the slave station distributors before the first element of the first traffic signal in the block is received.

II–B. The receiver (FIG. 12)

Some parts of the receiver circuit shown in FIG. 12 are in use when the station acts as a master station M and other parts are in use when the station acts as a slave station S. When the station acts as a master station M, only the answer-back signals "RI" and "RII" are received. When the station acts as a slave station, blocks of message signals are received, and in some cases also the special service signal "SI" requesting a repetition of an answer-back signal.

A receiver circuit of FIG. 12 in a remote station which is awaiting a call, has its 4800 cycles per second oscillator CR′ connected to a frequency divider FD′ which feeds 100 cycle per second pulses via conductor $100sc'$ to the receiver distributor DI′. Since the oscillators CR and CR′ shown in FIGS. 11 and 12 are the same and are both at the same station, a single oscillator may be employed to feed the separate frequency dividers FD and FD′. The frequency divider FD′ in the receiver circuit, however, has its synchronism adjusted according to the first element of each signal received via conductor 135 from conductor 131 to the synchronization correcting circuit CS, which in turn starts and synchronizes the pulses from frequency divider FD′ via conductor 136.

Also at each slave station S, transmitter distributor DI is locked in phase with its associated receiver distributor DI′ via the conductor 137 and switch MS′ in FIG. 11 operated by the master slave triggers MP–SP via the dotted line connection 138. However, when a station becomes a master station M, the master slave triggers MP–

SP operate the switch MS' into its position shown in full lines in FIG. 11.

Accordingly, the distributors DI and DI' at a slave station or DI' at a master station are only operated by and when a signal is received, and then they are operated by the first element of that signal via the conductor 135, circuit CS and conductor 136.

Suppose the station acts as a slave station S and has already detected the proper call signal through its radio transmitter RR via conductors 130 and 131, and shift register A–G to operate the call detector circuit CA. This shift register A–G is controlled by the pulses p4' from the pulse generator P4' which generator P4' in turn is controlled directly by the synchronized 100 cycle per second pulses 100cs' from the frequency divider FD'. Thus each signal as it is received in the shift register A–G is properly scanned and/or stepped through the register for detection, either in one of the special detecting circuits CA, RRI, RRII, Rβ, Rα, or SIR for call signals, answer-back signals, idle time signals, or request for repetition signals, respectively, or it is passed directly on to the code converter CC' via conductor 162.

This energized call detector circuit CA then operates the start circuit SSD which in turn controls the receiver distributor DI' and via conductor ssd also controls the master slave triggers MP-SP in its associated transmitter circuit (FIG. 11) to permit energization of the two answer-back signal generators RTI and RTII via conductor 98 and to prevent energization or to block the pulse p1 generator P1 via the conductor 99 so that message or idle time β signals cannot be transmitted from this slave station S. With the slave station receiver thus started, further assume that the generator RTI in its associated transmitted circuit of FIG. 11 has just transmitted the first state I answer-back signal "RI" to request the first block I of three signals from the master station M.

II(B)–1. Correct operation

These three traffic signals of block I are also assumed to be properly received over antenna 129 in FIG. 12, passed through the radio receiver RR via conductor 130 to the demodulator RD, and via conductor 131, tested in the error detector ED to be faultless, and passed via switch S'' to the shift register A–G. From the register A–G this block I of signals are passed via conductor 162 to the 7/5 code converter CC' where the seven element code signals are converted back into a five unit code and passed into the storage memory circuit ME' via conductor 163. These message signals are stepped through the 7/5 code converter circuit CC1 and memory ME' by the pulses p1' and p2' from pulse generators P1' and P2' controlled by the pulses d7' from the receiver distributor DI'. However, when an error occurs, the blocking circuit HA blocks these pulse generators P1' and P2' so that erroneous signals will not be passed on to the printer PR. From this memory ME', these signals are passed via conductor 164 to the start-stop element adding circuit STP, wherein a "start" and a "stop" element are added to the ends of each five-unit code signal before it is passed via conductor 165 to the printer PR, where it may be printed on a tape T'.

At the receiving or slave station there is also provided an idle time β signal detector Rβ, so that when blocks of three of these β signals are received via the radio receiver RR and tested to be faultless and passed to the shift register A–G, they are detected in detector Rβ which in turn produces a pulse rβ to control the pulse generator P1' and P2' to prevent the receiver distributor DI' from recording these idle time signals β or passing them on to the printer PR.

Since no error was found by the error detector ED, no pulse ed is passed to the blocking circuit HA, and no pulse ha is passed from the blocking circuit HA to the pulse generator P4 in the transmitter circuit of FIG. 11 to block the pulse generator P4. Accordingly the "RII" generator RTII for generating and transmitting the answer-back signal "RII" is controlled and operated by the pulse p4 and the pulses pd1–7 from the locked transmitter distributor DI. The generator RTI is not operated because it already has been operated for requesting the block I just received. The corrected reception of the answer-back signal "RII" at the master station requests the following block II of signals to be transmitted to the slave station.

II(B)–2. Mutilated operations

Suppose now that the block I signals are received mutilated at the slave station S. Then there is action in the error detector ED in FIG. 12, and a pulse ed is conveyed to the blocking circuit HA to produce a pulse ha to block the pulse generator P4 so it cannot generate the pulse p4 to step the answer-back signal generators RTI and RTII into their next block associated number II position. Thus these generators RTI and RTII remain in their I position and the transmitter distributor DI transmits again the signal "RI" requesting a repetition of the block I of signals.

If two successive answer-back signals "RI" or "RII" are transmitted, which is desirable in that if one is mutilated the other still can be detected, and if there isn't sufficient time during the time a to transmit and receive more than one of such answer-back signals, and if both of these answer-back signals "RI" are received mutilated at the master station during this a time plus the extended time c thereafter as described above, then the master station M will transmit a special service signal "SI" from the generator GSI to request the repetition of these answer-back signals. Suppose that this special service signal "SI" is received correctly in the slave station, having passed the error detector ED and the shift register A–G, and is detected in the "SI" detector SIR. The operation of this detector SIR produces a pulse sIr which is conducted to the blocking circuit HA which causes the pulse ha to block the pulse generator P4 in the transmitter of FIG. 11 which correspondingly causes the repetition of the last answer-back signal "RI" as previously described in section HH(A)–2 above.

If the receiving conditions at the slave station S are such that the received signals are mutilated over a longer period of time, then the slave station S will stop the transmission of the answer-back signals "RI" and "RII." This takes place via the time measuring device TO/TM under the control of the signal "SI" detector SIR, and the blocking circuit HA from the error detector ED. This time device TM/TO produces a pulse to to block the keyer KE in its associated transmitter circuit of FIG. 11, so that the master station M will receive no signals from this slave station S. The master station M, however, continues to transmit the signals "SI" to request an answer-back signal, and then when a correct reception of the signal "SI" is finally obtained in the slave station S, the detector SIR will control the timing device TO/TM via an sIr impulse to de-block the keyer KE and cause the transmitter at the slave station S to transmit again the last answer-back signal "RI" or "RII" in accordance with the last position of the triggers in the generators RTI and RTII.

In the receiver at the slave station S there is also a time measuring device FT to measure the time f as shown and described previously in FIGS. 4 and 6. This f-time is under the control of the slave station receiver distributor DI and its time is fixed after the transmission of the one or two successive answer-back signals "RI" or "RII." If during this time f any signal at all is received correctly at the slave station the time device f is satisfied, and there is transmitted again the answer-back signals "RI" or "RII." However, if this time f is passed and during this time f there is not received a signal correctly, then a pulse from this time device circuit FT via conductor ry acts upon the blocking circuit HA to cause the pulse generator P4 in the transmitter to be blocked via the conductor ha and correspondingly through the timing device TM/TO, the keyer KE also will be blocked, so that no more answer-back signals can be transmitted from the slave station S until a correct signal is received by the slave station S.

If the master station M transmits a group of three signals preceded by the signal α, then in the slave station S receiver, the special signal α is detected in the detector Rα connected to the shift register A–G. Now the f-time in the slave station has to be prolonged for this signal α, which is accomplished by conducting a pulse rα from the detector Rα to conductor ry from the time device FT to the radio receiver RR, so that the radio receiver RR is unblocked for the duration of one additional signal, namely signal α before the block of three character signals. This signal α at the beginning of a block of message signals is not recorded since this pulse rα also blocks the generator P1' that controls the 7/5 code converter CC' in the receiver. Furthermore, the pulse rα operates the pulse generator P3' which generates the pulse p3' to control the receiver distributor DI' for an additional revolution to compensate for this added signal α before the block.

The transmitting or master station M only receives answer-back signals "RI" and "RII" and their operation in the transmitter has already been described.

II–C. Other modifications

Another embodiment of the present invention involves the further checking of the signals between the two stations by placing therein inverter V in the transmitter (FIG. 11) by changing the position of switch S', so that alternate blocks of signals from the keyer KE are inverted before they are transmitted by the radio transmitter TR (See FIGS. 9 and 10 and Section I–F above). A pair of inverter circuits V1 and V2 are provided also after the demodulator RD and error detector ED in the receiver (FIG. 12) which are operated when the switch S" is changed from the position shown so that the received signals are passed through these inverter circuits V1 and V2 and the alternate blocks of signals are re-inverted before passing into the shift register A–G. If such inverters V, V1, V2 are used by operating switches S' and S" in FIGS. 11 and 12, respectively, it is not necessary that the answer-back signals I and II comprise as many elements as the message signals (see FIG. 10), so the detector circuits RRI and RRII in the receiver may then be correspondingly changed.

On the right side of the FIG. 12, a change-over circuit COC is shown which is described in more detail in the copending application Ser. No. 557,105 mentioned in Section III above. The circuit COC is connected to the memory circuit ME', the call generating and special service signal "SI" generating circuits CG and GSI, and also the master slave triggers MP–SP so that when a predetermined block of signals such as "FIGS." "+" "?," is received, which may be detected in the memory circuit ME', that indicates the end of the message, then this circuit COC is operated to change the station from a slave station S over to a master station M, and block the printer PR.

What is claimed is:

1. A telecommunication system for transmitting a message by spaced groups of constant ratio multi-element signals from one station (M) to another (S) and for automatically checking the errors and correcting them by repetition, said system comprising:
    (A) means (RT) for transmitting spaced groups of signals from one station (M),
    (B) means (ME) for storing the last group of signals transmitted from said one station,
    (C) means (RR) for receiving said groups of signals at said other station (S),
    (D) means (CO) at each station for counting the odd and even groups of signals that are successively transmitted and received at each station,
    (E) means (ED) for checking the correctness of each signal in each group of signals received at each station,
    (F) means (RTI and RTII) for transmitting from said other station one of two answer-back signals ("RI" or "RII") corresponding to said odd and even distinguished groups, which answer-back signals are transmitted in the space between said groups of said transmitted signals,
    (G) means (RRI and RII) at one station for detecting said answer-back signals during the spaces between said transmitted groups of signals,
    (H) means (HA) at said other station controlled by said checking means for controlling which one of two answer-back signals is transmitted from said other station depending upon the correctness of the group of signals just received, and
    (I) comparator means (CD) at said one station responsive to said detecting means for said answer-back signals and said counting means for controlling which group is next to be transmitted from said one station, that is, whether the last group transmitted from said one station is to be repeated from said memory means because said comparator indicates a disagreement between the position of said counting means and the answer-back signal detected, or whether the next message group is to be transmitted from said one station because said comparator indicates an agreement between the position of said counting means and the answer-back signal detected.

2. A system according to claim 1 including means (GSI) at said one station for transmitting a special request signal ("SI") to said other station to repeat an answer-back signal when said answer-back signal is faultily received.

3. A system according to claim 2 wherein said means for transmitting back said special service signal ("SI") includes means (CT) for preventing the transmission of said service signal until a predetermined time (a+c) after the receipt of said first answer-back signal should have been received.

4. A system according to claim 2 including means (SIR) at each station for detecting said special service signal ("SI") to request repetition of an answer-back signal and for controlling the repetition of the last transmitted answer-back signal.

5. A system according to claim 1 including means (PD) at each station for starting said counter means at all stations in the same position.

6. A system according to claim 1 wherein said comparator means causes the repetition of the last group of signals from said one station until said other station indicates by said answer-back signals that it has been correctly received at said other station.

7. A system according to claim 1 including means (AT and CT) for stopping the repeated transmission of the same answer-back signal after a predetermined period of time after no reception at said other station.

8. A system according to claim 1 including means (DI) for transmitting two of the same answer-back signals in succession during each space between said groups of signals transmitted from said one station to increase the probability of the correct reception of at least one of said two answer-back signals.

9. A system according to claim 1 wherein said space between said two groups of signals is based upon the propagation time between the two communicating stations.

10. A system according to claim 1 including means (CT) for automatically extending the space of time between two successive groups of signals a predetermined amount when the answer-back signal is not received within said space of time.

11. A system according to claim 10 wherein said predetermined amount of time for the extension is a whole number of multiple of times of the duration of one multi-element signal.

12. A system according to claim 1 wherein said means for controlling said answer-back signals operates as soon as an error is detected in one signal of said group signals being received.

13. A system according to claim 1 including means (V) for distinguishing one answer-back signal from the other by inverting the polarities of some of the elements of one answer-back signal with respect to said other answer-back signal.

14. A system according to claim 13 wherein the number of elements of said relatively inverted answer-back signals is less than the number of elements in the constant ratio multi-element message signals.

15. A system according to claim 13 wherein each of said relatively inverted answer-back signals includes a start element of the same polarity.

16. A system according to claim 1 wherein all said transmitting means and receiving means are tuned to the same carrier frequency.

17. A simplex telecommunication system between two stations for messages by spaced blocks of a plurality of multi-element code signals, comprising at each station:
 (A) a receiver and a transmitter for said spaced blocks of signals,
 (B) means (MS) for instigating a call in one direction towards the other station, whereby said information sending station becomes a master station and said information receiving station becomes a slave station,
 (C) means (ME) in the master station transmitted in for storing the number of signals transmitted in the last transmitted block of signals,
 (D) means (CO) for associating successive blocks of signals with alternate numbers I and II,
 (E) means (ED) at each receiver for detecting errors in any signal in each block,
 (F) means (RT I, RT II) in the slave station transmitter for generating and transmitting in said spaces answer-back signals corresponding to the numbers associated with said blocks,
 (G) means (CD) in the master station receiver for comparing the received answer-back signals with the associated number of the last transmitted block to control which block is to be transmitted next by said master station,
 (H) means (GSI) at the slave station transmitter for generating and transmitting a special counter service signal ("SI") to request the repetition of an answer-back signal when said answer-back signal has been determined to be multilated by said error detecting means,
 (I) means (SIR) at the master station receiver for detecting said special service signal ("SI") and to send that answer-back signal that is in said answer-back signal generating means, and
 (J) means (MP–SP) responsive to said call instigating means for generating said special counter service signal for starting a transmission between said stations.

18. A system according to claim 17 including:
 (K) a timer means (AT, CT and FT) for controlling the duration of the spaces between said blocks of signals according to whole multiples of the time of duration of one signal in each block and according to the propagation time between said two stations.

19. A system according to claim 18 including distributor means (DI, DI') in each station for controlling said timer means.

20. A system according to claim 19 including means (CS) at each receiver for correcting the synchronization of said distributors in accordance with the first element of each signal received.

21. A system according to claim 17 including means (AG) at the master station transmitter for generating and transmitting a special idle time signal (α) preceding each repeated block of signals from said storing means controlled by said comparing means.

22. A system according to claim 21 including means (P3′) at each slave station receiver for extending the reception time for a block of signals the duration of said signal (α) after receiving said idle time signal (α).

23. A system according to claim 17 including means at each slave station receiver for printing the block of signals correctly received.

24. A telecommunication system for transmitting a message by spaced groups of constant ratio multi-element signals from one station (M) to another station (S), and for automatically checking for errors and correcting them by repetition, said system comprising:
 (A) means (KE, RT) for transmitting spaced groups of multi-element signals from said one station to said other station,
 (B) means (CO) for distinguishing between the odd and even groups of signals that are successively transmitted and received at each station,
 (C) means (RR, AG) for receiving the spaced groups of signals transmitted from said one station to said other station,
 (D) means (ED) for checking for correctness each signal of each group of signals received at said other station,
 (E) means (RTI, RTII) for transmitting from said other station for reception at said one station during the space between said transmitted groups of signals from said one station, one of two answer-back signals ("RI" and "RII") corresponding to the odd and even associated group last correctly received,
 (F) means (HA) for controlling which one of said two answer-back signals is transmitted from said other station depending upon the checking of the correctness of the group of signals last received, whereby said answer-back signal either requests the next group to be transmitted from said one station or requests that the last group transmitted from said one sation be repeated because it was checked to be erroneously received by said other station,
 (G) means (RRI or RRII) for detecting at said one station which one of said two answer-back signals was transmitted from said other station during the space between said groups of signals,
 (H) means (CD) for controlling the transmission of the next group of signals from said one station in accordance with the distinguishing characteristic of the answer-back signal received from said other station during said space,
 (I) means (HI) for repeating the last group of signals transmitted from said one station when said answer-back signal received corresponds with the distinguishing characteristic of the last transmitted group of signals,
 (J) means (HH, P1, P2) for transmitting from said one station the next group of signals when said answer-back signal received corresponds with the distinguishing characteristic of the next group of signals to be transmitted,
 (K) means (GSI) for transmitting from said one station a special service signal ("SI") to request the repetition of an answer-back signal when neither one of said two answer-back signals are correctly received at said one station,
 (L) means (SIR) for detecting at said other station the reception of said special service signal ("SI") for repeating the transmission of the last transmitted answer-back signal, and
 (M) means (HA, RQ, P4) for continuing the repetition of signals from either station until a correct has been indicated to have been received.

25. A simplex telecommunication system for transmitting a message by spaced groups of signals from an information sending station (M) to an information receiving station (S), said system having means (ED and HA) for detecting and correcting errors by means of automatic repetition, said system being characterized by:

(I) each information sending station having:
- (A) means (CO) for discriminating, counting and numbering the groups of signals transmitted therefrom,
- (B) means (ME) for storing the group of signals last transmitted,
- (C) means (D7, DI) for stepping said counting means,
- (D) means (RRI, RRII) for detecting separate answer-back signals ("RI," "RII") from the information receiving station corresponding to said groups during the spaces between said groups of signals,
- (E) means (CD) connected to said detecting means for comparing the detected answer-back signals with said counting means,
- (F) means (HH and P1) connected to said comparing means for continuing the transmission of said groups,
- (G) means (HH and P3) connected to said comparing means for repeating the transmission of the last transmitted group and stopping said stepping means from operating said counting means,
- (H) means (ED) for checking said answer-back signals for mutilation, and
- (I) means (HI and GSI) connected to said checking means for transmitting a special signal ("SI") requesting repetition of a multilated answer-back signal; and (II) each information receiving station having:
- (A) means (DI, D7) for counting groups of signals received from said sending station,
- (B) means (CS) for controlling said receiver counting means for starting said counting means with the reception of the first unmutilated group signal of a message that is received from said sending station,
- (C) means (RTI, RTII) connected to said counting means in said receiving station for generating and transmitting said separate answer-back signals ("RI" and "RII") corresponding to the stepping position of said counting means in said receiving station,
- (D) means (ED) for checking each signal in said groups of signals for mutilation as each signal is received,
- (E) means (HA, HI, P1) connected to said checking means for controlling said stepping means in said receiving station for continuing said stepping means in said receiving station when said last named group is checked to be unmutilated,
- (F) means (HA, HI, P4) connected to said checking means for controlling said stepping means in said receiving station for stopping said stepping means in said receiving station when the last received group is checked to be mutilated,
- (G) means (SIR) for detecting said special service signal ("SI") requesting repetition of said last transmitted answer-back signal,
- (H) means (HI) connected to said special service signal detecting means for repeating the last transmitted answer-back signal,
- (I) means (PR) for printing unmutilated received groups of signals, and
- (J) means (HA) connected to said checking means in said receiving station for blocking said printing means when a group of signals has been checked to be mutilated.

References Cited

UNITED STATES PATENTS 3,001,017  9/1961  Dirks.
3,233,974  12/1965  Kok et al.

THOMAS A. ROBINSON, Primary Examiner

U.S. Cl. X.R.

178—23; 340—146

PO-1050
(5/69)

UNITED STATES PATENT OFFICE
CERTIFICATE OF CORRECTION

Patent No. 3,461,238          Dated August 12, 1969

Inventor(s) Hendrik Cornelis Anthony van Duuren, Christiaan Johannes van Dalen, and Herman da Silva It is certified that error appears in the above-identified patent and that said Letters Patent are hereby corrected as shown below:

Column 2, line 38, "correct", second occurrence, should read --incorrect-. Column 5, line 10, after "long", insert --as--. Column 7, line 25, after "10", delete --and--. Column 10, line 23, "dalay" should read --delay--. Column 12, line 37, "ration" should read --ratio--. Column 13, line 72, "RH" should read -- "R II" --. Column 15, line 34, "transmitted" should read --transmitter--. Column 16, line 41, "HH(A)-2" should read --II-A-2--. Column 18, line 13, after "of", insert --said--. Column 19, line 30, "transmitted" should read --transmitter--.

SIGNED AND
SEALED
MAY 5 1970

(SEAL)
Attest:

Edward M. Fletcher, Jr.
Attesting Officer

WILLIAM E. SCHUYLER, JR.
Commissioner of Patents